United States Patent
Tsutsumi (10) Patent No.: US 10,919,395 B2
(45) Date of Patent: Feb. 16, 2021

(54) ELECTRIC DRIVE DUMP TRUCK

(71) Applicant: HITACHI CONSTRUCTION MACHINERY CO., LTD., Tokyo (JP)

(72) Inventor: Yoshiaki Tsutsumi, Tsuchiura (JP)

(73) Assignee: HITACHI CONSTRUCTION MACHINERY CO., LTD., Tokyo (JP)

(*) Notice: Subject to any disclaimer, the term of this patent is extended or adjusted under 35 U.S.C. 154(b) by 437 days.

(21) Appl. No.: 15/756,251

(22) PCT Filed: Sep. 12, 2016

(86) PCT No.: PCT/JP2016/076791
§ 371 (c)(1),
(2) Date: Feb. 28, 2018

(87) PCT Pub. No.: WO2017/115500
PCT Pub. Date: Jul. 6, 2017

(65) Prior Publication Data
US 2018/0251033 A1 Sep. 6, 2018

(30) Foreign Application Priority Data
Dec. 28, 2015 (JP) .................. 2015-256211

(51) Int. Cl.
*B60L 5/24* (2006.01)
*B60P 1/04* (2006.01)
(Continued)

(52) U.S. Cl.
CPC ............... *B60L 5/24* (2013.01); *B60L 5/04* (2013.01); *B60L 5/16* (2013.01); *B60L 5/26* (2013.01);
(Continued)

(58) Field of Classification Search
CPC ...... B60L 5/04; B60L 5/16; B60L 5/24; B60L 5/26; B60L 5/30; B60L 11/12; B60M 1/13; B60P 1/04
See application file for complete search history.

(56) References Cited

U.S. PATENT DOCUMENTS

2013/0105264 A1* 5/2013 Ruth ..................... B60L 5/26
191/59.1
2015/0136555 A1* 5/2015 Kanazawa ............. B60L 5/30
191/59.1
(Continued)

FOREIGN PATENT DOCUMENTS

JP 2006-353043 A 12/2006
JP 2010-183771 A 8/2010
(Continued)

OTHER PUBLICATIONS

International Search Report of PCT/JP2016/076791 dated Nov. 15, 2016.

*Primary Examiner* — Jason C Smith
(74) *Attorney, Agent, or Firm* — Mattingly & Malur, PC (57) ABSTRACT

An electric drive dump truck travels by contacting, with trolley lines, power collection units configured to be moved up and down by lifting devices and receiving electrical power from the trolley lines. A position detection device is configured to detect a position of the electric drive dump truck; a vehicle speed detection device is configured to detect a vehicle speed of the electric drive dump truck; and a storage section is configured to store a position of the trolley lines and a time (hereinafter referred to as a moving-up time) until the power collection units contact with the trolley lines since the power collection units start moving up. A control device is configured to output a signal indicating that the power collection units can be moved up based on the
(Continued)

position and vehicle speed of the electric drive dump truck, the position of the trolley lines, and the moving-up time.

8 Claims, 9 Drawing Sheets

(51) Int. Cl.
  *B60L 5/26* (2006.01)
  *B60L 50/15* (2019.01)
  *B60L 5/16* (2006.01)
  *B60L 5/04* (2006.01)
  *B60L 5/30* (2006.01)
  *B60M 1/13* (2006.01)

(52) U.S. Cl.
  CPC .............. *B60L 5/30* (2013.01); *B60L 50/15* (2019.02); *B60M 1/13* (2013.01); *B60P 1/04* (2013.01); *B60L 2200/44* (2013.01); *B60L 2240/12* (2013.01); *B60L 2240/62* (2013.01); *B60L 2240/80* (2013.01); *B60L 2250/10* (2013.01); *Y02T 10/7072* (2013.01)

(56) References Cited

U.S. PATENT DOCUMENTS

| | | | |
|---|---|---|---|
| 2015/0321563 A1* | 11/2015 | Buehs | B60L 5/28 191/54 |
| 2017/0259740 A1* | 9/2017 | Tsutsumi | H04N 7/183 |
| 2018/0251033 A1* | 9/2018 | Tsutsumi | B60L 5/16 |
| 2019/0126777 A1* | 5/2019 | Pasquale | B60L 3/12 |
| 2020/0009955 A1* | 1/2020 | Nakamura | B60K 6/22 |

FOREIGN PATENT DOCUMENTS

| | | |
|---|---|---|
| JP | 2011-130579 A | 6/2011 |
| JP | 2014-143838 A | 8/2014 |

* cited by examiner

ELECTRIC DRIVE DUMP TRUCK

TECHNICAL FIELD

The present invention relates to an electric drive dump truck.

BACKGROUND ART

In a known series-hybrid electric drive dump truck that travels in a mine, an engine drives an electric generator, electrical power generated by the electric generator is supplied to a motor of each rear wheel to drive the rear wheel. In a current trolley scheme traveling technology, instead of the electrical power supply by the engine and the electric generator, such an electric configuration is used in a configuration in which trolley lines typically employed for a train are installed in a predetermined upslope section, and power collection units (slide plate) provided to a vehicle body and configured to be moved up and down are moved up to contact with the trolley lines, thereby receiving electrical power for travelling (hereinafter referred to as trolley travel). In this case, the electrical power supplied from the trolley lines is larger than electrical power generated by the engine, and thus decrease of the travel speed can be avoided in an upslope section where the trolley travel is possible.

Patent Literature 1 discloses a pantograph automatic lifting device configured to control a pantograph drive unit to move up a pantograph when it is detected that a vehicle is at a predetermined position, the pantograph is moved down, and the vehicle is stopped.

CITATION LIST

Patent Literature

Patent Literature 1
Japanese Patent Laid-open No. 2010-183771

SUMMARY OF INVENTION

Technical Problem

Typically, the driver of an electric drive dump truck temporarily stops or decelerates the electric drive dump truck and then operates an operation device for performing an operation to move up and down the power collection units, after the electric drive dump truck enters a trolley travel section. However, the electric drive dump truck has a vehicle weight heavier than that of a typical vehicle, and thus consumes a larger amount of fuel when stopping or starting traveling. Thus, the fuel consumption is large when the power collection units are moved up after the electric drive dump truck is temporarily stopped or decelerated in the trolley travel section.

The fuel consumption can be reduced by moving up the power collection units while the electric drive dump truck is traveling when entering the trolley travel section. However, in this case, the driver needs to perform an operation to move up the power collection units at an appropriate timing at the entry into the trolley travel section while taking into account, for example, the vehicle speed, the distance to the trolley travel section, and a time (moving-up time) until the power collection units contact with the trolley lines since the operation to move up the power collection units are performed. Thus, the operation requires experience and skill.

Solution to Problem

An electric drive dump truck according to an aspect of the present invention is an electric drive dump truck that travels by contacting, with trolley lines, power collection units configured to be moved up and down by lifting devices and receiving electrical power from the trolley lines, the electric drive dump truck including: a position detection device configured to detect a position of the electric drive dump truck; a vehicle speed detection device configured to detect a vehicle speed of the electric drive dump truck; a storage section configured to store a position of the trolley lines and a time (hereinafter referred to as a moving-up time) until the power collection units contact with the trolley lines since the power collection units start moving up; and a control device configured to output a signal indicating that the power collection units can be moved up based on the position and vehicle speed of the electric drive dump truck, the position of the trolley lines, and the moving-up time.

Advantageous Effects of Invention

According to the present invention, power collection units can be moved up at an appropriate timing without experience and skill, thereby reducing fuel consumption.

DESCRIPTION OF EMBODIMENTS

First Embodiment

Figure 1:
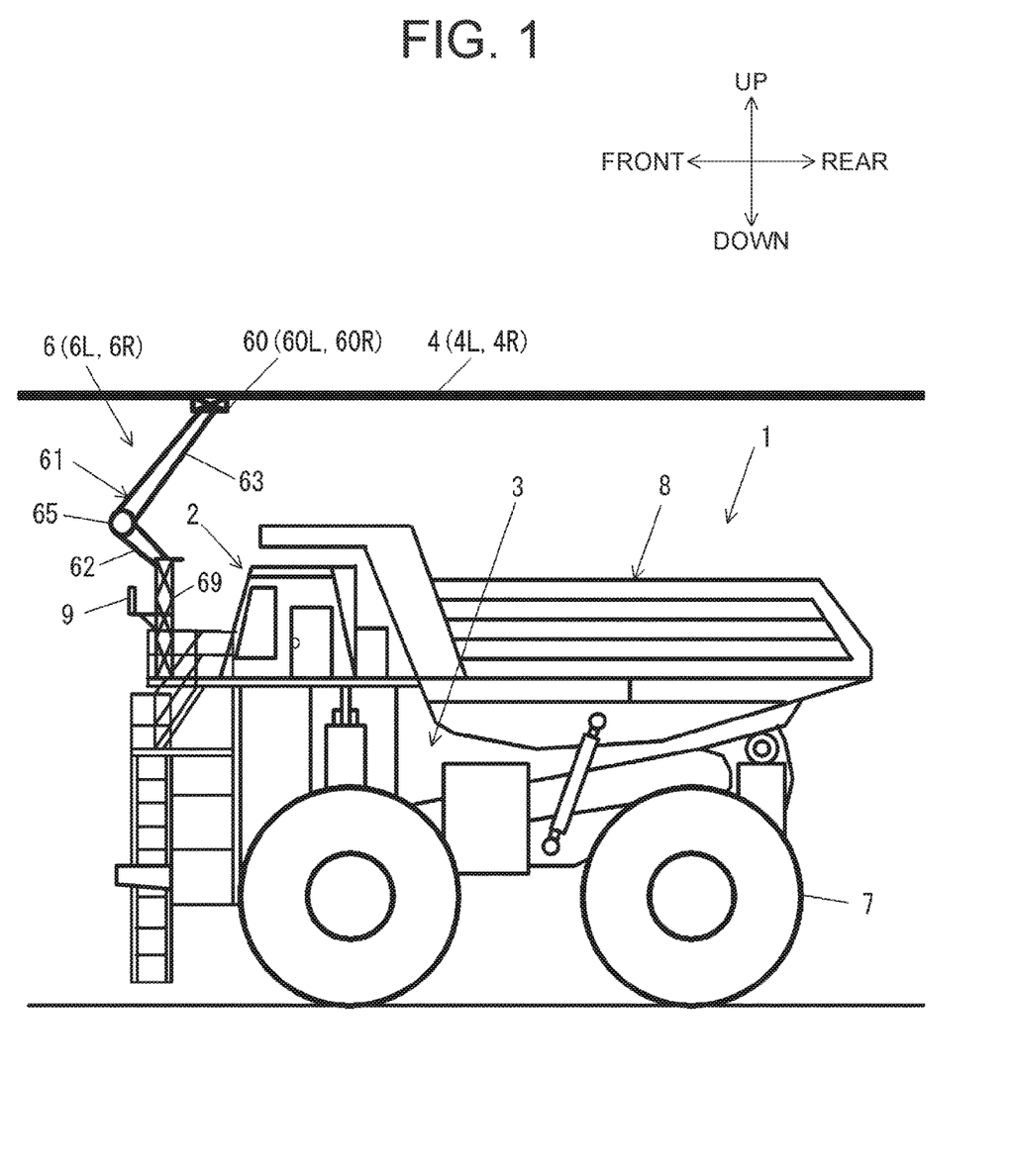
FIG. 1 is a side view of an electric drive dump truck.

FIG. 1 is a side view of an electric drive dump truck according to an embodiment of the present invention. The electric drive dump truck (hereinafter simply referred to as a dump truck 1) according to the present embodiment is a supersized dump truck that transports, for example, crushed rocks mined at a mine or the like. As illustrated in FIG. 1, the dump truck 1 includes a vehicle body 3, an operating room 2 provided at a front part of the vehicle body 3, a vessel 8 that is held by the vehicle body 3 and onto which cargo is loaded, and a hydraulic pressure cylinder configured to tilt the vessel 8.

The dump truck 1 is a trolley-type dump truck that drives a motor by directly receiving electrical power from trolley lines (wires) on an upslope. The dump truck 1 includes a pair of right and left power collection devices (also referred to as pantographs) 6R and 6L configured to receive electrical power from two positive and negative trolley lines 4R and 4L on right and left sides. The pair of right and left power collection devices 6R and 6L are provided on the right and left sides on a front side of the operating room 2.

The power collection device 6L on the left side and the power collection device 6R on the right side have identical configurations. Thus, in the following description, the power collection devices 6R and 6L, power collection units 60L and 60R, and the trolley lines 4L and 4R are collectively referred to as a power collection device 6, a power collection unit 60, and a trolley line 4, respectively. The description will be made on a schematic of configuration of the power collection device 6 on the left side.

The power collection device 6 according to the present embodiment is what is called a single-arm pantograph. The power collection device 6 includes the power collection unit 60 configured to contact with the trolley line 4, and a lifting device configured to move up and down the power collection unit 60. The power collection devices 6R and 6L are disposed on the vehicle body 3 so that the power collection unit 60L on the left side contacts with the trolley line 4L on the left side and the power collection unit 60R on the right side contacts with the trolley line 4R on the right side.

The lifting device includes a foldable support mechanism 61, and a drive device configured to drive the support mechanism 61 to move up and down the power collection unit 60 supported by the support mechanism 61. The drive device includes a spring (not illustrated), a hydraulic pressure cylinder 27 (refer to FIG. 3), and a switching valve 28 (refer to FIG. 3). The support mechanism 61 includes a lower arm 62 and an upper arm 63. The lower arm 62 has a base end part swingably attached to a base frame 69. The lower arm 62 has a leading end part provided with a coupling shaft 65. The coupling shaft 65 is swingably coupled with a base end part of the upper arm 63. The power collection unit 60 is swingably supported at a leading end part of the upper arm 63. The power collection unit 60 includes a power collection shoe body, and a flat slide plate made of, for example, copper or carbon and attached to the power collection shoe body.

The hydraulic pressure cylinder 27 (not illustrated in FIG. 1; refer to FIG. 3) included in the lifting device of the power collection device 6 includes a piston rod and a cylinder tube. An end part of the cylinder tube as a base end side of the hydraulic pressure cylinder 27 is attached to the base frame 69, and an end part of the piston rod as a leading end side of the hydraulic pressure cylinder 27 is attached to the lower arm 62. The lower arm 62 stands up when the hydraulic pressure cylinder 27 expands, or lies down when the hydraulic pressure cylinder 27 contracts.

The spring (not illustrated) included in the lifting device of the power collection device 6 has one end attached to the base frame 69 and the other end attached to an arm (not illustrated) extending toward the front side from the base end part of the upper arm 63. The arm (not illustrated) is positioned on the front side of the coupling shaft 65 and pulled downward by the spring. Accordingly, the upper arm 63 is pressed in the anticlockwise direction about the coupling shaft 65 at a rotational center in FIG. 1. In other words, a part of the upper arm 63 on the back side of the coupling shaft 65 is pressed upward by the spring (not illustrated). The range of rotation of the upper arm 63 is regulated by a stopper (not illustrated).

Figure 3:
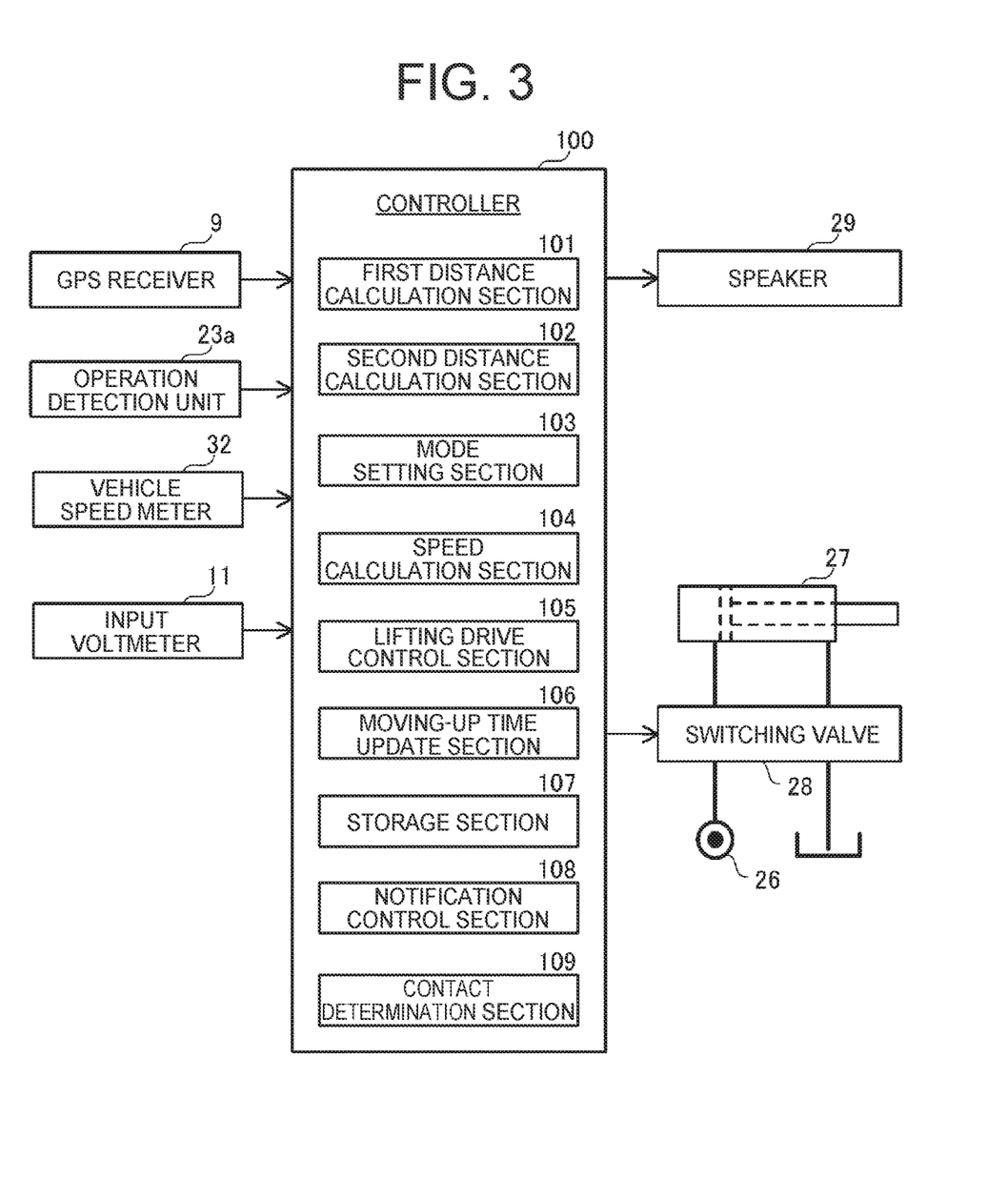
FIG. 3 is a block diagram illustrating the configuration of a control system of a power collection device of an electric drive dump truck according to a first embodiment.

As described above, in the power collection device 6 according to the present embodiment, the lower arm 62 stands up when the hydraulic pressure cylinder 27 expands, and accordingly, the upper arm 63 stands up due to the spring. As illustrated in FIG. 3, the hydraulic pressure cylinder 27 is connected with a hydraulic pressure source 26 through the switching valve 28. Expansion and contraction of the hydraulic pressure cylinder 27 (refer to FIG. 3) are controlled by switching the switching valve 28 in response to a switching signal from a controller 100 to be described later.

When the switching valve 28 receives inputting of a switching signal corresponding to a move-up command from the controller 100, pressurized oil is supplied to a bottom chamber of the hydraulic pressure cylinder 27 to expand the hydraulic pressure cylinder 27. The expansion of the hydraulic pressure cylinder 27 stands up the lower arm 62 illustrated in FIG. 1, and the spring (not illustrated) stands up the upper arm 63, thereby moving up the power collection unit 60. When the switching valve 28 receives inputting of a switching signal corresponding to a move-down command from the controller 100, pressurized oil is supplied to a rod chamber of the hydraulic pressure cylinder 27 to contract the hydraulic pressure cylinder 27, thereby moving down the power collection unit 60.

The power collection device 6 illustrated in FIG. 1 is configured to move up and down between a retracted posture as a lower limit position and an upper limit position. The upper limit position is set to be higher than the height of the trolley line 4. When the power collection unit 60 contacts with the trolley line 4, the power collection device 6 has a connection posture in which the power collection unit 60 elasticity presses the trolley line 4 by elastic force of the spring (not illustrated).

The dump truck 1 includes two front wheels and four rear wheels 7, the rear wheels 7 serving as drive wheels, and the front wheels serving as driven wheels. The rear wheels 7 are driven by an electric motor (not illustrated) provided inside an axle as a tubular body included in a wheel axis on a rear wheel side.

A global positioning system (GPS) receiver 9 is provided at a front part of the vehicle body 3.

Figure 2:
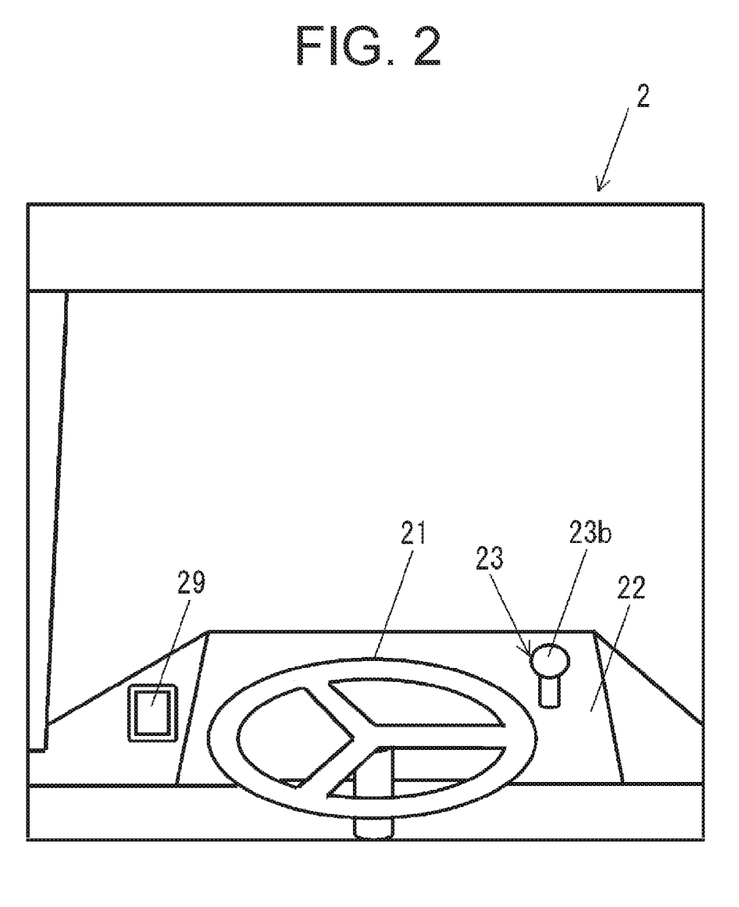
FIG. 2 is a pattern diagram illustrating an exemplary internal configuration of an operating room.

The operating room 2 is provided with a driver seat on which a driver sits and various operation devices for operating the dump truck 1. FIG. 2 is a pattern diagram illustrating an exemplary internal configuration of the operating room 2. The operating room 2 is provided with a handle (steering wheel) 21 with which the driver performs a travel (steering) operation, and a console 22 configured to display meters and gauges. The console 22 is provided with an activation lever device 23 for performing operations to move up and down the power collection unit 60 of each power collection device 6 (6L and 6R), and a speaker 29 configured to output information by sound.

FIG. 3 is a block diagram illustrating the configuration of a control system of the power collection device 6 of the dump truck 1 according to a first embodiment. The control system of the power collection device 6 includes the controller 100, and the GPS receiver 9, an operation detection unit 23a of the activation lever device 23, an input voltmeter 11, a vehicle speed meter 32, and the speaker 29, which are connected with the controller 100. The controller 100 includes an arithmetic processing device including a CPU, a storage section 107 such as a ROM or a RAM, and any other peripheral circuit.

The GPS receiver 9 receives radio wave from a plurality of GPS satellites (not illustrated) to calculate the current time and a latitude and a longitude, (Xs, Ys), indicating the current position of the dump truck 1 (hereinafter also referred to as the own vehicle), and outputs information on the calculated latitude and longitude (Xs, Ys) to the controller 100.

The activation lever device 23 includes a lever 23b (refer to FIG. 2) and the operation detection unit 23a configured to detect an operation position of the lever 23b. The lever 23b is switched between a retracted position (OFF position) as an operation position and a connection position (ON position) as an operation position. When the lever 23b is at the retracted position, the operation detection unit 23a outputs, to the controller 100, a move-down command signal to move down the power collection unit 60. When the lever 23b is at the connection position, the operation detection unit 23a outputs, to the controller 100, a move-up command signal to move up the power collection unit 60.

Having received inputting of the move-down command signal, the controller 100 outputs a switching signal corresponding to the move-down command to the switching valve 28 of a hydraulic pressure circuit included in the lifting device of the power collection device 6 to contract the hydraulic pressure cylinder 27, thereby moving down the power collection unit 60. Having received inputting of the move-up command signal, the controller 100 outputs a switching signal corresponding to the move-up command to the switching valve 28 of the hydraulic pressure circuit included in the lifting device of the power collection device 6 to expand the hydraulic pressure cylinder 27, thereby moving up the power collection unit 60.

The input voltmeter 11 measures voltage between the power collection unit 60L configured to contact with the positive trolley line 4L and the power collection unit 60R configured to contact with the negative trolley line 4R, and outputs, to the controller 100, information on the measured voltage (hereinafter also referred to as an input voltage) applied between the power collection units 60L and 60R.

The vehicle speed meter 32 detects a vehicle speed Ve of the dump truck 1, and outputs information on the detected vehicle speed Ve to the controller 100. The vehicle speed meter 32 is a milliwave radar configured to detect the relative speed of the own vehicle with respect to a travel surface by exploiting the Doppler effect.

The controller 100 functionally includes a first distance calculation section 101, a second distance calculation section 102, a mode setting section 103, a speed calculation section 104, a lifting drive control section 105, a moving-up time update section 106, a notification control section 108, and a contact determination section 109.

Figure 4A:
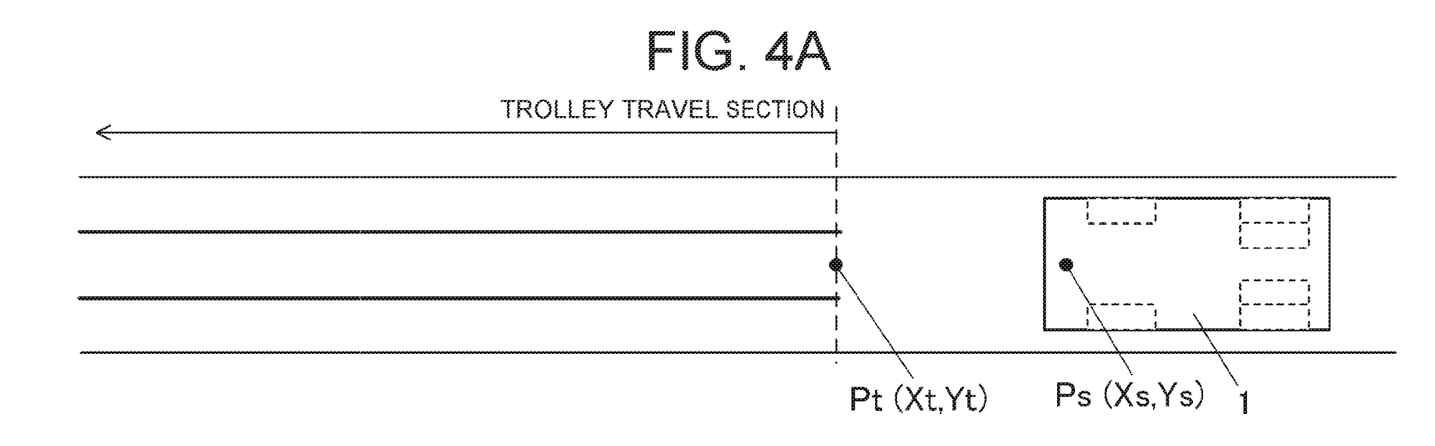
FIG. 4A is a plane pattern diagram illustrating a trolley travel section
Figure 4B:
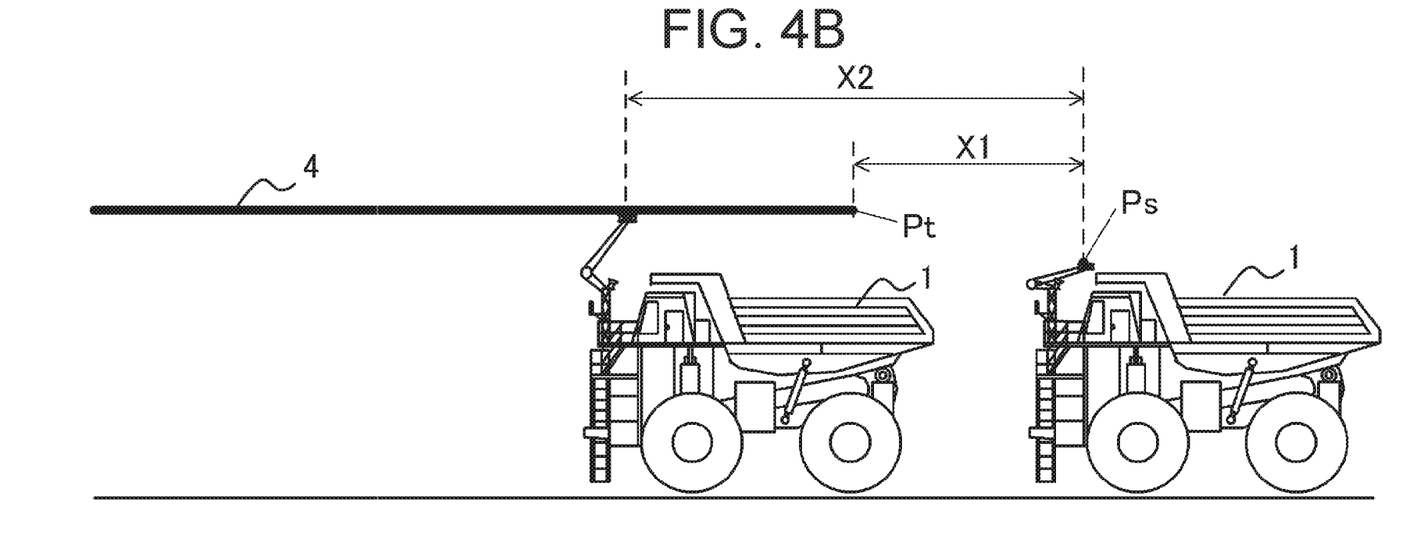
FIG. 4B is a pattern diagram illustrating a situation in which the power collection device of the dump truck transitions from a retracted posture to a connection posture.

The storage section 107 of the controller 100 stores information on GPS coordinates of a section (hereinafter referred to as a trolley travel section) of a travel path on which the trolley line 4 is laid and the latitude and longitude (Xt, Yt) of a section start place Pt. FIG. 4A is a plane pattern diagram illustrating the trolley travel section, and FIG. 4B is a pattern diagram illustrating a situation in which the power collection device 6 of the dump truck 1 transitions from the retracted posture to the connection posture. As illustrated in FIG. 4, the section start place Pt is one piece of information indicating the position of the trolley line 4 at which the power collection unit 60 contacts with the trolley line 4 and the dump truck 1 can start trolley travel while receiving electrical power from the trolley line 4. The section start place Pt is set in advance as a position at which the dump truck 1 enters the trolley travel section.

The first distance calculation section 101 (refer to FIG. 3) calculates the distance between a current place Ps of the own vehicle at the latitude and longitude (Xs, Ys) as position information of the own vehicle, and the section start place Pt at the latitude and longitude (Xt, Yt) as position information of the trolley line 4, as the distance (hereinafter referred to as a first distance X1) between the current place Ps of the own vehicle and the section start place Pt.

The storage section 107 illustrated in FIG. 3 stores a necessary time (hereinafter referred to as a moving-up time N) until the power collection unit 60 in the retracted posture moves up and contacts with the trolley line 4 since the power collection unit 60 starts moving up. In the present specification, the timing when the power collection unit 60 starts moving up corresponds to a timing when the lever 23b is operated from the retracted position to the connection position while the power collection device 6 is in the retracted posture.

The moving-up time N is stored as a highly accurate value in an overwritten manner by the moving-up time update section 106 to be described later, and thus has an initial value set in advance to a time sufficiently longer than a designed value, for example, twice as large as the designed value. The initial value of the moving-up time N may be set to be a value obtained by measuring a time until the power collection unit 60 contacts with the trolley line 4 since the lever 23b is operated to the connection position while the dump truck 1 is stopped in the trolley travel section. The moving-up time N may be optionally set by an operator.

The second distance calculation section 102 multiplies the moving-up time N by the vehicle speed Ve of the own vehicle to calculate an estimated distance (hereinafter referred to as a second distance X2) by which the own vehicle moves until the power collection unit 60 contacts with the trolley line 4 since the power collection unit 60 starts moving up (Ve×N=X2).

The mode setting section 103 determines whether the second distance X2 is longer than the first distance X1. When the second distance X2 is longer than the first distance X1 (X2≥X1), the mode setting section 103 determines that the power collection unit 60 is in a state in which the power collection unit 60 can be moved up, and sets a lever effective mode. When the second distance X2 is shorter than the first distance (X2<X1), the mode setting section 103 determines that the power collection unit 60 is in a state in which the power collection unit 60 cannot move up, and sets a lever ineffective mode.

The lifting drive control section 105 performs lifting drive control of the power collection device 6 as follows.

(a) When the operation detection unit 23a detects that the lever 23b is operated to the connection position while the lever effective mode is set, the lifting drive control section 105 controls the switching valve 28 to expand the hydraulic pressure cylinder 27, thereby moving up the power collection unit 60. In other words, the lifting drive control section 105 validates operation position information (the move-up command) output from the operation detection unit 23a.

(b) When the operation detection unit 23a detects that the lever 23b is operated to the connection position while the lever ineffective mode is set, the position of the hydraulic pressure cylinder 27 is maintained at the current position. In other words, the lifting drive control section 105 invalidates the operation position information (move-up command) output from the operation detection unit 23*a*.

When the operation detection unit 23*a* detects that the lever 23*b* is operated to the retracted position, the lifting drive control section 105 controls the switching valve 28 irrespective of the lever effective or ineffective mode to contract the hydraulic pressure cylinder 27, thereby moving down the power collection unit 60.

When both conditions (i) and (ii) below hold, the notification control section 108 outputs, to the speaker 29, a sound output signal as a signal indicating that the power collection unit 60 can be moved up. When at least one of the conditions (i) and (ii) does not hold, the notification control section 108 does not output the sound output signal to the speaker 29.

(i) The lever effective mode is set.
(ii) The lever 23*b* is operated to the retracted position.

Having received inputting of the sound output signal, the speaker 29 outputs, for example, sound guidance or beep sound as a notification to the driver that the power collection unit 60 can be moved up.

When the operation detection unit 23*a* detects that the lever 23*b* is operated from the retracted position to the connection position, the speed calculation section 104 divides the first distance X1 by the moving-up time N to calculate a speed (hereinafter referred to as a necessary speed Vn) necessary for the own vehicle to reach the section start place Pt of the trolley travel section in the moving-up time N (Vn=X1/N).

The lifting drive control section 105 determines whether the vehicle speed Ve is lower than the necessary speed Vn. When it is determined that the vehicle speed Ve is lower than the necessary speed Vn while the power collection unit 60 is moving up, the lifting drive control section 105 controls the switching valve 28 of the hydraulic pressure circuit included in the lifting device stops the hydraulic pressure cylinder 27 expanding and stops the power collection unit 60 moving up. In other words, the lifting drive control section 105 interrupts moving-up operation by the lifting device of the power collection device 6.

The contact determination section 109 determines whether the power collection unit 60 contacts with the trolley line 4 based on a detection signal from the input voltmeter 11. When an input voltage Vo is higher than a threshold Vo1 (Vo>Vo1), the contact determination section 109 determines that the power collection unit 60 contacts with the trolley line 4. When the input voltage Vo is equal to or lower than the threshold Vo1 (Vo≤Vo1), the contact determination section 109 determines that the power collection unit 60 does not contact with the trolley line 4.

The threshold Vo1 is a threshold set to determine whether the power collection units 60L and 60R contact with the trolley lines 4L and 4R, respectively, and is set in advance by, for example, an experiment and stored in the storage section 107. For example, it is found by an experiment that the input voltage Vo is 0 [V] when the power collection unit 60 does not contact with the trolley line 4, whereas the input voltage Vo is 2000 [V] approximately when the power collection unit 60 contacts with the trolley line 4. In this case, the threshold Vo1 may be set to be an arbitrary value, for example, 1000 [V] between 0 [V] and 2000 [V].

When the operation detection unit 23*a* detects that the lever 23*b* is operated from the retracted position to the connection position, the moving-up time update section 106 starts time measurement with a built-in timer of the controller 100. When the contact determination section 109 determines that the power collection unit 60 contacts with the trolley line 4, the moving-up time update section 106 ends the time measurement with the timer and stores a measured time as the moving-up time N in an overwriting manner. In other words, the moving-up time update section 106 measures a time until the power collection unit 60 contacts with the trolley line 4 since an operation to move up the power collection unit 60 is performed through the activation lever device 23, and stores this measured time t as the moving-up time N in the storage section 107, thereby updating the moving-up time N. The measured time t to which a margin α is added is preferably stored as the moving-up time N at the update.

Figure 5:
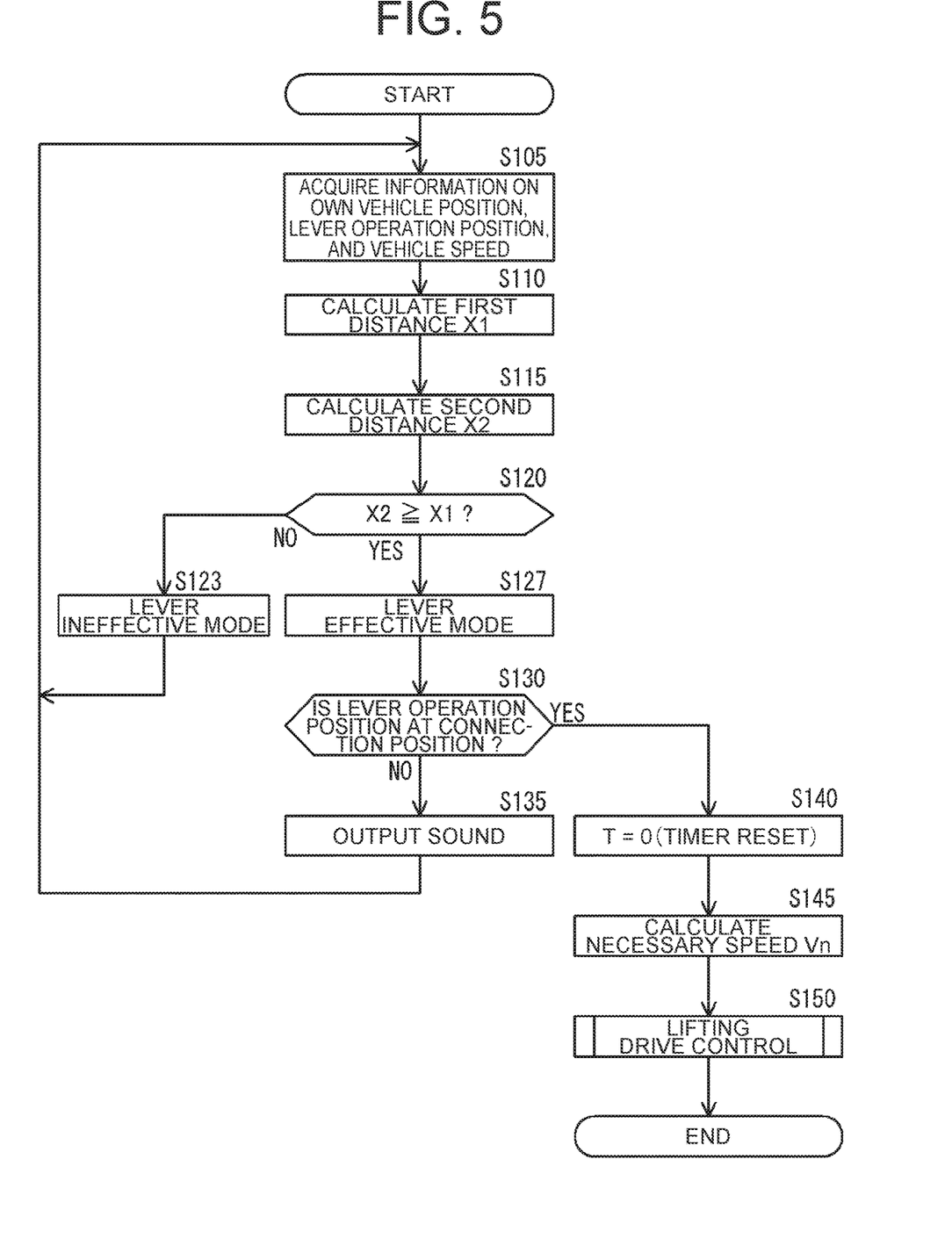
FIG. 5 is a flowchart of exemplary processing of an operation support program executed by a controller according to the first embodiment.

FIG. 5 is a flowchart illustrating exemplary processing of an operation support program executed by the controller 100 according to the first embodiment. The processing illustrated in this flowchart is started, for example, when an operation support switch (not illustrated) is turned on, and then repeatedly executed in a predetermined control period after initial setting (not illustrated) is performed. The lever effective mode is set at the initial setting. When the operation support switch (not illustrated) is turned off, the processing of the operation support program described below is not executed.

At step S105, the controller 100 acquires various pieces of information on the latitude and longitude (Xs, Ys) indicating the position of the own vehicle detected by the GPS receiver 9, the operation position of the lever 23*b* detected by the operation detection unit 23*a*, the vehicle speed Ve detected by the vehicle speed meter 32, and the like, and then proceeds to step S110. The various pieces of information are acquired at each predetermined control period, in other words, in real time.

At step S110, the controller 100 calculates the first distance X1 based on the latitude and longitude (Xs, Ys) of the current place Ps of the own vehicle acquired at step S105 and the latitude and longitude (Xt, Yt) of the section start place Pt stored in the storage section 107, and then proceeds to step S115. At step S115, the controller 100 calculates the second distance X2 by multiplying the vehicle speed Ve of the own vehicle acquired at step S105 by the moving-up time N, and then proceeds to step S120.

At step S120, the controller 100 compares the first distance X1 calculated at step S110 and the second distance X2 calculated at step S115 and determines whether the second distance X2 is equal to or longer than the first distance X1. The controller 100 proceeds to step S123 when the determination at step S120 is negative, or proceeds to step S127 when the determination at step S120 is positive.

At step S123, the controller 100 sets the lever ineffective mode, and then returns to step S105. At step S127, the controller 100 sets the lever effective mode, and then proceeds to step S130.

At step S130, the controller 100 determines whether the lever 23*b* is currently operated to the connection position based on the information on the operation position of the lever 23*b* acquired at step S105. When the determination at step S130 is negative, in other words, when it is determined that the lever 23*b* is operated to the retracted position, the controller 100 proceeds to step S135. When the determination at step S130 is positive, in other words, when it is determined that the lever 23*b* is operated to the connection position, the controller 100 proceeds to step S140.

At step S135, the controller 100 outputs, to the speaker 29, the sound output signal indicating that the power collection unit 60 can be moved up, and then returns to step S105. Having received inputting of the sound output signal, the speaker 29 outputs, by sound to the driver, a notification that the power collection unit 60 can be moved up.

At step S140, the controller 100 initializes a time T measured by the timer to zero (in other words, resets the timer), and then proceeds to step S145. At step S145, the controller 100 calculates the necessary speed Vn based on the first distance X1 calculated at step S110 and the moving-up time N stored in the storage section 107, and then proceeds to step S150.

Figure 6:
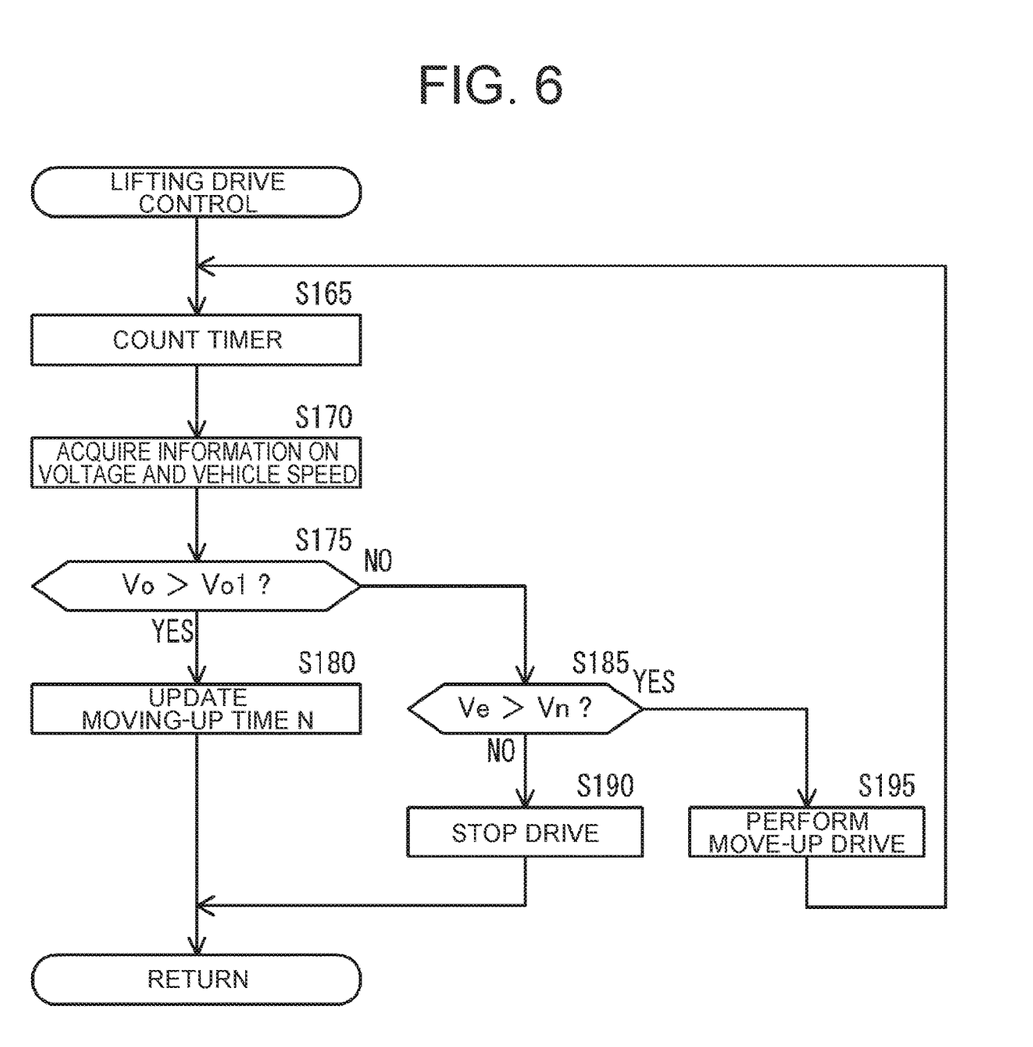
FIG. 6 is a flowchart of the processing content of lifting drive control of a power collection unit by the controller.

At step S150, the controller 100 performs the lifting drive control. FIG. 6 is a flowchart illustrating the processing content of the lifting drive control of the power collection unit 60 by the controller 100. As illustrated in FIG. 6, at step S165, the controller 100 executes processing of counting the built-in timer, and then proceeds to step S170.

At step S170, the controller 100 acquires information on the input voltage Vo detected by the input voltmeter 11, the vehicle speed Ve detected by the vehicle speed meter 32, and the like, and then proceeds to step S175. At step S175, the controller 100 determines whether the input voltage Vo is higher than the threshold Vo1 stored in the storage section 107. The controller 100 proceeds to step S180 when the determination at step S175 is positive, or proceeds to step S185 when the determination at step S175 is negative.

At step S180, the controller 100 performs processing of updating the moving-up time N, and then ends the processing illustrated in the flowcharts in FIGS. 5 and 6. The update processing at step S180 is processing of storing the time t measured by the timer in an overwriting manner as the moving-up time N.

At step S185, the controller 100 determines whether the vehicle speed Ve acquired at step S170 is higher than the necessary speed Vn calculated at step S145. The controller 100 proceeds to step S190 when the determination at step S185 is negative, or proceeds to step S195 when the determination at step S185 is positive.

At step S190, the controller 100 outputs, to the switching valve 28, a switching signal for stopping operation of the hydraulic pressure cylinder 27 included in the lifting device, and then ends the processing illustrated in the flowcharts in FIGS. 5 and 6. At step S195, the controller 100 outputs, to the switching valve 28, a switching signal for expanding the hydraulic pressure cylinder 27 included in the lifting device, and then returns to step S165.

The operation according to the present embodiment is summarized as follows. The vehicle is activated when the driver turns on an ignition switch of the dump truck 1. An engine drives an electric generator, and electrical power generated by the electric generator is supplied to an electric motor of the rear wheels 7. When the driver steps on an acceleration pedal, the electric motor of the rear wheels 7 is driven by the electrical power generated by the electric generator, and the rear wheels 7 are rotated to travel the dump truck 1.

Having found that the section start place Pt of the trolley travel section is ahead of the dump truck 1, the driver turns on the operation support switch (not illustrated). When the operation support switch is turned on, the operation support program is read out to execute operation support control. As illustrated in FIG. 4B, when the dump truck 1 approaches the section start place Pt of the trolley travel section and the distance between (in other words, the first distance X1) the section start place Pt and the dump truck 1 becomes shorter than a distance (in other words, the second distance X2) necessary for moving up the power collection device 6 (pantograph), the speaker 29 outputs sound guidance or beep sound (Yes at S120, No at S130, and S135). Accordingly, the driver is notified that a distance at which the power collection device 6 can be moved up is reached, and switches the lever 23b of the activation lever device 23 to the connection position (Yes at S130).

The power collection unit 60 is moved up by the lifting device of the power collection device 6, and the power collection unit 60 contacts with the trolley line 4 in the trolley travel section. When the power collection unit 60 contacts with the trolley line 4, the electric motor of the rear wheels 7 is driven by electrical power supplied from the trolley line 4. In other words, the dump truck 1 performs trolley travel.

The vehicle speed decreases when a deceleration operation is performed after the driver switches the lever 23b of the activation lever device 23 to the connection position. When the vehicle speed decreases, the power collection unit 60 of the power collection device 6 is potentially moved up to the upper limit position before the section start place Pt is reached. In such a case, in the present embodiment, the power collection device 6 automatically stops moving up (No at S185, and S190). It is preferable that, having automatically stopped, the power collection device 6 resumes moving up, for example, when the driver operates the lever 23b of the activation lever device 23 back to the retracted position and then to the connection position.

Effects as described below are achieved by the above-described embodiment.

(1) The dump truck 1 according to the present embodiment is an electric drive dump truck that travels by contacting, with the trolley line 4, the slide plate of the power collection unit 60 configured to be moved up and down by the lifting device and receiving electrical power from the trolley line 4. The dump truck 1 includes the GPS receiver 9 configured to detect a position of the own vehicle, the vehicle speed meter 32 configured to detect a vehicle speed Ve of the own vehicle, and the storage section 107 configured to store a position of the trolley line 4 and the time (in other words, the moving-up time N) until the power collection unit 60 contacts with the trolley line 4 since the power collection unit 60 starts moving up. The controller 100 outputs a signal indicating that the power collection unit 60 can be moved up based on the position and vehicle speed Ve of the own vehicle, the position of the trolley line 4, and the moving-up time N. When the controller 100 outputs the signal indicating that the power collection unit 60 can be moved up, the speaker 29 notifies the driver that the power collection unit 60 can be moved up.

Accordingly, the driver is not required to have experience and skill to start moving up the power collection unit 60 at an appropriate timing before the trolley travel section during travel. Specifically, the lifting device can be driven to move up the power collection unit 60 of the power collection device 6 before the dump truck 1 enters the trolley travel section so that the power collection unit 60 contacts with the trolley line 4 immediately after the dump truck 1 enters the trolley travel section, thereby increasing a section in which the trolley travel is actually performed in the trolley travel section. In other words, the trolley line 4 can be used in a larger range of the trolley travel section, thereby effectively reducing fuel consumption.

(2) The controller 100 calculates the distance (in other words, the first distance X1) between the current place Ps of the own vehicle detected by the GPS receiver 9 and the section start place Pt of the trolley travel section stored in the storage section 107. The controller 100 calculates a distance (in other words, the second distance) by which the own vehicle moves until the power collection unit 60 contacts with the trolley line 4 since the power collection unit 60 starts moving up based on the vehicle speed Ve of the own vehicle detected by the vehicle speed meter 32 and the moving-up time N stored in the storage section 107. When the second distance X2 is shorter than the first distance X1, the controller 100 does not output the signal indicating that the power collection unit 60 can be moved up. When the second distance X2 is longer than the first distance, the controller 100 outputs the signal indicating that the power collection unit 60 can be moved up.

When the second distance X2 is shorter than the first distance X1, the controller 100 invalidates the command to move up the power collection unit 60. When the second distance X2 is longer than the first distance X1, the controller 100 validates the command to move up the power collection unit 60. In other words, the controller 100 does not move up the power collection unit 60 when the operation to move up the power collection unit 60 is performed through the activation lever device 23 while the second distance X2 is shorter than the first distance X1. Accordingly, the power collection unit 60 can be prevented from moving up when the lever 23b of the activation lever device 23 is operated to the connection position at a position separated from the trolley travel section. As a result, the dump truck 1 can be prevented from entering the trolley travel section after the power collection unit 60 is moved up to an upper limit height of the power collection unit 60 set to be higher than the trolley line 4. This configuration can prevent contact between the power collection device 6 and the trolley line 4 at an unintended site, thereby preventing damage on the power collection device 6.

(3) When the operation to move up the power collection unit 60 is performed through the activation lever device 23, the controller 100 divides the first distance X1 by the moving-up time N to calculate the necessary speed Vn at which the section start place Pt of the trolley travel section can be reached in the moving-up time N. When the vehicle speed Ve is lower than the necessary speed Vn, the controller 100 stops the lifting device moving up the power collection unit 60. Accordingly, the power collection unit 60 can be prevented from being continuously moved up when the vehicle speed Ve decelerates after the power collection unit 60 starts moving up. As a result, the dump truck 1 can be prevented from entering the trolley travel section after the power collection unit 60 is moved up to the upper limit height of the power collection unit 60 set to be higher than the trolley line 4. This configuration can prevent contact between the power collection device 6 and the trolley line 4 at an unintended site, thereby preventing damage on the power collection device 6.

(4) The input voltmeter 11 configured to detect the input voltage from the trolley line 4 and the controller 100 configured to determine whether the power collection unit 60 contacts with the trolley line 4 based on the detected input voltage Vo serve as a contact detection unit configured to detect contact between the power collection unit 60 and the trolley line 4. The controller 100 measures the time until the power collection unit 60 contacts with the trolley line 4 since the operation to move up the power collection unit 60 is performed through the activation lever device 23, and stores, as the moving-up time N in the storage section 107, a time determined based on the measured time t. In other words, the moving-up time N is updated each time when the dump truck 1 enters the trolley travel section and the above-described control based on the operation support program is performed to drive the lifting device to move up the power collection unit 60. Accordingly, the moving-up time N can be obtained at higher accuracy when the height of the trolley line 4 is different between work places, and the trolley line 4 can be used in an appropriately increased range of the trolley travel section, thereby improving the effect of reducing fuel consumption.

Second Embodiment

Figure 7:
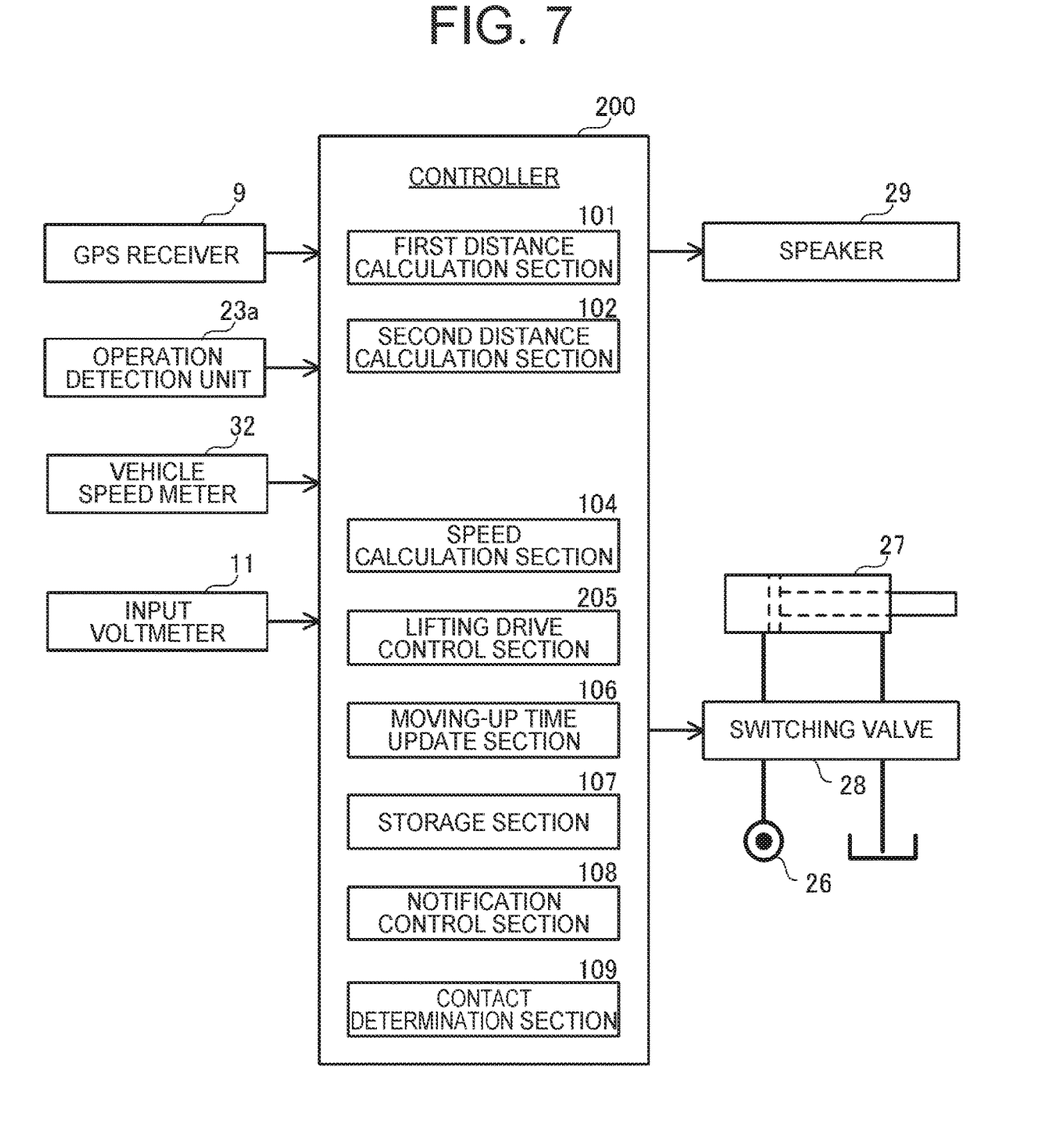
FIG. 7 is a block diagram illustrating the configuration of the control system of the power collection device of the electric drive dump truck according to a second embodiment.
Figure 8:
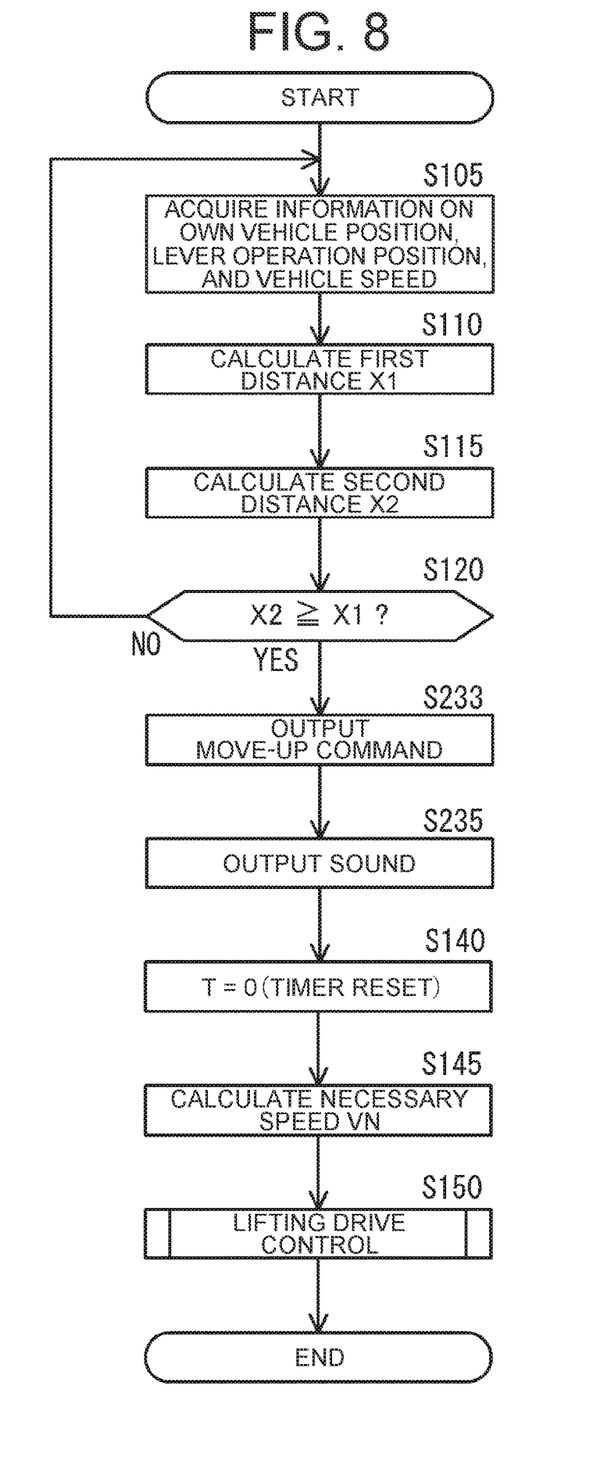
FIG. 8 is a flowchart of exemplary processing of the operation support program executed by a controller according to the second embodiment.

The following describes a dump truck according to a second embodiment with reference to FIGS. 7 and 8. FIG. 7 is a block diagram illustrating the configuration of the control system of the power collection device 6 of the dump truck 1 according to the second embodiment. In FIGS. 7 and 8, any part identical or equivalent to that in the first embodiment is denoted by an identical reference sign, and any difference between the embodiments will be mainly described.

In the first embodiment, the controller 100 outputs, to the speaker 29, the sound output signal as the signal indicating that the power collection unit 60 can be moved up, and the speaker 29 notifies the driver that the power collection unit 60 can be moved up. However, a lifting drive control section 205 of a controller 200 according to the second embodiment outputs, to the lifting device of the power collection device 6, the move-up command signal as the signal indicating that the power collection unit 60 can be moved up, and then the power collection unit 60 is automatically moved up.

FIG. 8 is a flowchart illustrating exemplary processing of the operation support program executed by the controller 200 according to the second embodiment, in which processing at steps S233 and S235 is executed in place of steps S123, S127, S130, and S135 in the flowchart in FIG. 5. The processing illustrated in this flowchart is started when the operation support switch (not illustrated) is turned on.

As illustrated in FIG. 8, in the second embodiment, the controller 200 returns to step S105 when the determination at step S120 is negative, or proceeds to step S233 when the determination at step S120 is positive. At step S233, the controller 200 outputs, as the signal indicating that the power collection unit 60 can be moved up, a switching signal corresponding to the move-up command signal to the switching valve 28, and then proceeds to step S235. Accordingly, the hydraulic pressure cylinder 27 expands to automatically move up the power collection unit 60.

At step S235, the controller 200 outputs sound guidance telling that the power collection device 6 is automatically moving up, and then proceeds to step S140.

In the second embodiment thus configured, since the power collection unit 60 automatically moves up when the trolley travel section is approached, the power collection unit 60 can be moved up at an appropriate timing without experience and skill, similarly to the first embodiment. The trolley line 4 can be used in an increased range of the trolley travel section by moving up the power collection unit 60 at an appropriate timing, thereby effectively reducing fuel consumption. Since the power collection unit 60 automatically moves up, an operation load on the driver can be reduced as compared to the first embodiment.

Modifications as described below are included in the scope of the present invention, and one or a plurality of the modifications may be combined with each embodiment described above.

(Modification 1)

Although each embodiment describes above the example (refer to FIG. 4A) in which the power collection device 6 is moved up in the dump truck 1 traveling straight toward the start point of the straight trolley travel section, the present invention is not limited thereto. When a travel road surface curves right before the start point of the trolley travel section, in other words, when the trolley travel section is set continuously with a curved section, a position at which the dump truck 1 enters may be corrected based on a curvature of the road surface in the travel section as described below.

Figure 9A:
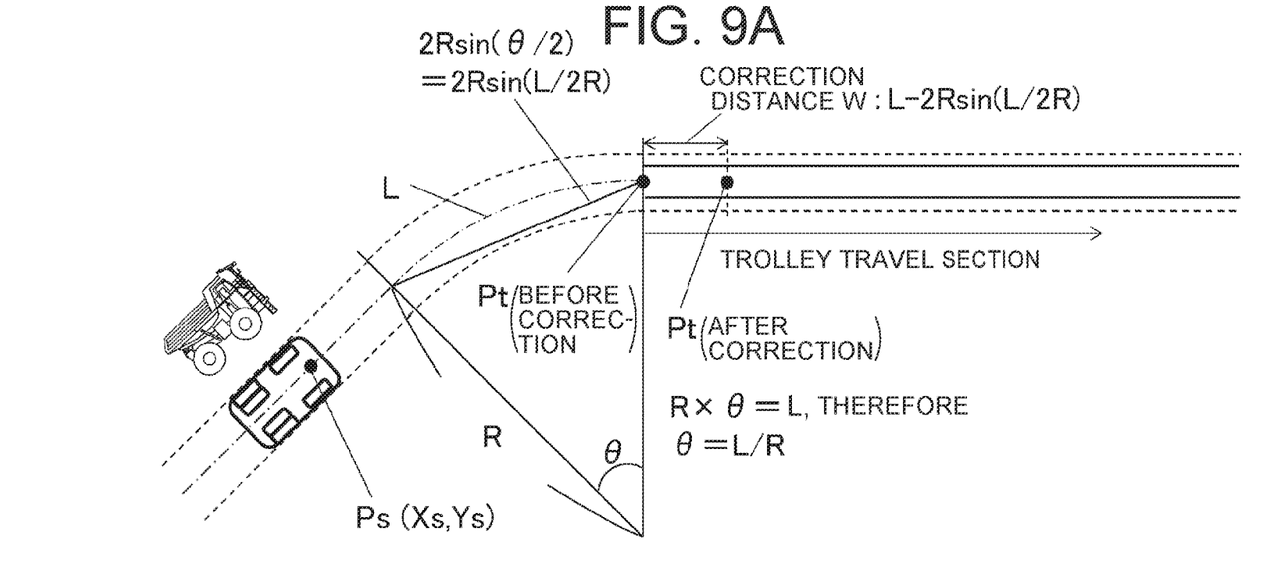
FIG. 9A is a diagram for description of a method of correcting a section start place when a travel road surface curves right before the trolley travel section

FIG. 9A is a diagram for description of a method of correcting the section start place when the travel road surface curves right before the trolley travel section. As illustrated in FIG. 9A, for example, when R [m] represents the radius of the travel path in a curved section, and θ represents the rotational angle of the own vehicle, the length (arc length) L [m] of the central axis of the travel path in the curved section is expressed as R×θ (L=R×θ). In this case, the controller 100 corrects the section start place Pt, which is set at the start point of the trolley travel section, to be further inside the trolley travel section by a correction distance W=L−2R sin(L/2R) [m], and stores the corrected section start place Pt in the storage section 107. The first distance calculation section 101 calculates the first distance X1 based on the corrected section start place Pt and the current place Ps of the own vehicle.

According to such a modification, when a curved section is continuous with the start point of the trolley travel section, the power collection devices 6L and 6R can contact with the trolley lines 4L and 4R in a section in which the trolley travel is possible.

(Modification 2)

Figure 9B:
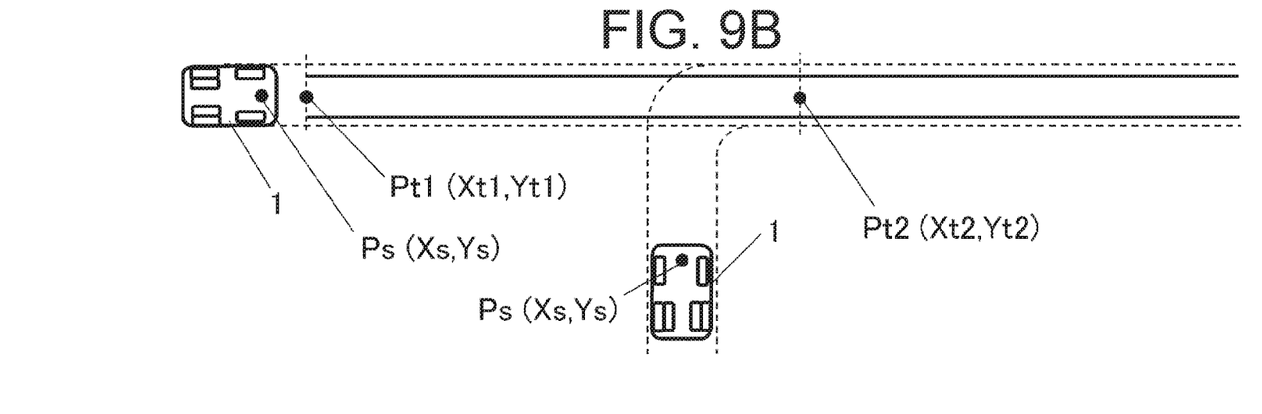
FIG. 9B is a diagram for description of an example in which a plurality of section start places are set to one trolley travel section.

FIG. 9B is a diagram for description of an example in which a plurality of section start places are set to one trolley travel section. As illustrated in FIG. 9B, when there are a plurality of entry routes in one trolley travel section, a plurality of section start places Pt1, Pt2, . . . are stored in the storage section 107 in advance. The section start place Pt1 (Xt1, Yt1) as a first entry place is set to be the start point of the trolley travel section, and the section start place Pt2 (Xt2, Yt2) as a second entry place is set to be a middle place between the start and end points of the trolley travel section. In this case, the controller 100 calculates the distance between the current place Ps of the own vehicle and each of the section start places Pt1 and Pt2 at a plurality of entry places to determine a section start place Pt having the shortest distance, and calculates the first distance X1 by using the determined section start place Pt. The trolley line 4 can be used in an increased range of the trolley travel section when there are a plurality of entry routes, thereby effectively reducing fuel consumption.

The storage section 107 includes a storage region where a position at which the dump truck 1 enters the trolley travel section is stored as a position on the trolley line 4. With this configuration, the move-up command guide (sound) of the power collection unit 60 and the automatic move-up drive of the power collection unit 60 described above can be performed when the dump truck 1 uses a plurality of trolley travel sections or part of a trolley line section. Thus, the present invention is applicable to various work places.

(Modification 3)

In each above-described embodiment, the controller 100 calculates the distance (in other words, the first distance X1) between the position Ps of the own vehicle detected by the GPS receiver 9 and the position Pt of the trolley line 4 stored in the storage section 107. The controller 100 calculates the vehicle speed Ve of the own vehicle detected by the vehicle speed meter 32 and a distance (in other words, the second distance X2) by which the own vehicle moves until the power collection unit 60 contacts with the trolley line 4 since the power collection unit 60 starts moving up based on the moving-up time N stored in the storage section 107. The controller 100 does not output the signal indicating that the power collection unit 60 can be moved up when the second distance X2 is shorter than the first distance X1, or outputs the signal indicating that the power collection unit 60 can be moved up when the second distance X2 is longer than the first distance X1. In this manner, the embodiment describes above the example in which a distance is used as an index indicating whether the power collection unit 60 can be moved up, but the present invention is not limited thereto.

For example, the controllers 100 and 200 divide the first distance X1 by the vehicle speed Ve of the own vehicle to calculate a reach time T1 necessary for the own vehicle to reach the position of the trolley line 4. The controller 100 compares the reach time T1 and the moving-up time N. The controller 100 does not output the signal indicating that the power collection unit 60 can be moved up when the reach time T1 is longer than the moving-up time N (T1>N), or outputs the signal indicating that the power collection unit 60 can be moved up when the reach time T1 is shorter than the moving-up time N. In this manner, effects same as those of the above-described embodiments can be achieved when whether the power collection unit 60 can be moved up is determined by using a time as an index.

(Modification 4)

Although each embodiment describes above the example in which GPS satellites are used to detect the position of the own vehicle, the present invention is not limited thereto. For example, a transmitter may be installed in the trolley travel section and a receiver may be installed in the dump truck 1 so that the relative position of the dump truck 1 with respect to the trolley travel section can be detected.

(Modification 5)

The controller 100 calculates the mass (hereinafter referred to as a load mass M) of a loaded object to be transported based on, for example, the pressure of a suspension cylinder of the dump truck 1, and the operation support program is not to be executed when the operation support switch (not illustrated) is turned on but the load mass M is equal to or smaller than a threshold M0. Accordingly, the controller 100 does not output the signal indicating that the power collection unit 60 can be moved up when a predetermined condition is satisfied but the load mass M is equal to or smaller than the threshold M0. In other words, the controller 100 has the functionality of an invalidation section configured to invalidate, when the load mass M is equal to or smaller than the threshold M0, the signal indicating that the power collection unit 60 can be moved up. The threshold M0 is a threshold for sensing empty load and stored in the storage section 107 in advance as a predetermined value smaller than a maximum mass value that can be loaded onto the dump truck 1, for example, half of the maximum mass value. According to the present modification, the automatic move-up function can be turned off when the load mass is small.

The trolley travel section is provided for upward travel on an upslope lane, but no trolley line is set in a travel section for downward travel on a downslope lane adjacent to the upslope lane. According to the present modification, when the dump truck 1 travels downward on a downslope toward a mine while the operation support switch is turned on, it is possible to prevent outputting of sound guidance indicating that the power collection unit 60 can be moved up or the automatic move-up drive of the power collection unit 60 as the dump truck 1 approaches the section start place Pt. The load mass M may be detected by a load sensor. The present invention is not limited to the configuration in which the controller 100 invalidates the signal indicating that the power collection unit 60 can be moved up. A switch configured to cut off a signal between the controller 100 and the speaker 29 or between the controller 200 and the switching valve 28 may be employed to invalidate the signal (sound output signal or the move-up command signal) indicating that the power collection unit 60 can be moved up.

(Modification 6)

The vehicle speed meter 32 is not limited to a milliwave radar, but a laser radar may be employed. The vehicle speed may be calculated based on a wheel speed detected by a wheel speed sensor.

(Modification 7)

The configuration of the lifting device of the power collection device 6 and the shape of the power collection unit 60 are not limited to those described above in the embodiments, but various kinds of configurations and shapes are applicable. The power collection device 6 may be, for example, a rhombus pantograph.

(Modification 8)

Although each embodiment describes above the example in which sound is used in the method of notifying that the power collection unit 60 can be moved up, the present invention is not limited thereto. For example, a display monitor or a display device such as a lamp may be used to notify the driver that the power collection unit 60 can be moved up.

Although various kinds of embodiments and modifications are described above, the present invention is not limited to these contents. Any other possible aspect in the scope of the technical idea of the present invention is included in the scope of the present invention.

The present application claims the benefit of priorities of the following application, the entire contents of which are incorporated herein by reference:

Japan Patent Application No. 2015-256211 (filed on Dec. 28, 2015)

REFERENCE SIGNS LIST

1 dump truck (electric drive dump truck), 4 trolley line, 6 power collection device, 9 GPS receiver (position detection device), 11 input voltmeter (contact detection unit), 23 activation lever device (operation device), 27 hydraulic pressure cylinder (lifting device, drive device), 28 switching valve (lifting device, drive device), 29 speaker (notification device), 32 vehicle speed meter (vehicle speed detection device), 60 power collection unit, 61 support mechanism (lifting device), 100 controller (control device), 101 first distance calculation section, 102 second distance calculation section, 104 speed calculation section, 105 lifting drive control section, 106 moving-up time update section, 107 storage section, 108 notification control section (signal output section), 109 contact determination section (contact detection unit), 200 controller (control device), 205 lifting drive control section (signal output section)

The invention claimed is:

1. An electric drive dump truck that travels by contacting, with trolley lines, power collection units configured to be moved up and down by lifting devices and receiving electrical power from the trolley lines, the electric drive dump truck comprising:
    a position detection device configured to detect a position of the electric drive dump truck;
    a vehicle speed detection device configured to detect a vehicle speed of the electric drive dump truck;
    a memory configured to store a position of the trolley lines and a time of upward movement from when the power collection unit starts to move upward to the trolley lines until the power collection unit contacts with the trolley lines start moving up; and
    a controller configured to output a signal indicating that the power collection units can be moved upward to the trolley lines based on the position and vehicle speed of the electric drive dump truck, the position of the trolley lines, and the upward movement time;
    wherein the memory includes a region for storing, as the position of the trolley lines, a position at which the electric drive dump truck enters a travel section in which the trolley lines are provided, and
    wherein the controller is further configured to correct the position at which the electric drive dump truck enters based on a curvature of a road surface in the travel section.

2. The electric drive dump truck according to claim 1, further comprising a notification device configured to notify, when the signal indicating that the power collection units can be moved upward is output by the controller, an operator of the dump truck that the power collection units can be moved upward.

3. The electric drive dump truck according to claim 2, wherein the controller is configured to:
    calculate a first distance between the position of the electric drive dump truck detected by the position detection device and the position of the trolley lines stored in the memory;
    calculate, based on the vehicle speed detected by the vehicle speed detection device and the upward movement time stored in the memory, a second distance by which the electric drive dump truck moves until the power collection units contact with the trolley lines from when the power collection units start to move upward to the trolley lines; and
    wherein the controller is further configured not to output, when the second distance is shorter than the first distance, the signal indicating that the power collection units can be moved upward to the trolley lines, and configured to output, when the second distance is longer than the first distance, the signal indicating that the power collection units can be moved upward to the trolley lines.

4. The electric drive dump truck according to claim 3, further comprising an activation lever operably connected through the controller to the lifting device that moves the power collection units up and down, wherein
    the controller is further configured to command the lifting device not to move up the power collection units when the second distance is shorter than the first distance.

5. The electric drive dump truck according to claim 3, further comprising an activation lever operably connected through the controller to the lifting device that moves the power collection units up and down, wherein:
    the controller is configured to divide, when an operation to move up the power collection units is performed, the first distance by the upward movement time to calculate a necessary speed for the power collection units to reach the position of contact with the trolley lines in the upward movement time; and
    when the vehicle speed is lower than the necessary speed, the controller is configured to command the lifting device to stop moving up the power collection units.

6. The electric drive dump truck according to claim 1, wherein the lifting device includes a drive device that moves the power collection units upward when the signal indicating that the power collection units can be moved upward is output by the controller.

7. The electric drive dump truck according to claim 1, further comprising:
- an activation lever operably connected through the controller to the lifting device that moves the power collection units up and down; and
- a contact detection unit configured to detect contact between the power collection units and the trolley lines,
- wherein the controller is further configured to measure a time from when the activation lever causes the lifting device to move the power collection unit upward to the trolley lines until the power collection units contact the trolley lines, and store in the memory, as the upward movement time, a time determined based on the measured time.

8. An electric drive dump truck that travels by contacting, with trolley lines, power collection units configured to be moved up and down by lifting devices and receiving electrical power from the trolley lines, the electric drive dump truck comprising:
- a position detection device configured to detect a position of the electric drive dump truck;
- a vehicle speed detection device configured to detect a vehicle speed of the electric drive dump truck;
- a memory configured to store a position of the trolley lines and a time of upward movement from when the power collection unit starts to move upward to the trolley lines until the power collection unit contacts with the trolley lines;
- a controller configured to output a signal indicating that the power collection units can be moved upward to the trolley lines based on the position and vehicle speed of the electric drive dump truck, the position of the trolley lines, and the upward movement time; and
- the controller being further configured to invalidate the signal indicating that the power collection units can be moved upward when the mass of a loaded object is equal to or smaller than a predetermined value smaller than a maximum mass that is able to be loaded on the electric drive dump truck.

* * * * *